No. 612,133. Patented Oct. 11, 1898.
W. B. LEONARD.
AGRICULTURAL IMPLEMENT.
(Application filed May 16, 1898.)

(No Model.) 3 Sheets—Sheet 1.

WITNESSES: INVENTOR
William B. Leonard.
BY
Chester Bradford,
ATTORNEY.

No. 612,133. Patented Oct. 11, 1898.
W. B. LEONARD.
AGRICULTURAL IMPLEMENT.
(Application filed May 16, 1898.)
(No Model.) 3 Sheets—Sheet 3.

WITNESSES:
G. Chas. Conner
J. A. Walsh

INVENTOR
William B. Leonard.
BY
Chester Bradford,
ATTORNEY.

UNITED STATES PATENT OFFICE.

WILLIAM B. LEONARD, OF WALLACE, INDIANA.

AGRICULTURAL IMPLEMENT.

SPECIFICATION forming part of Letters Patent No. 612,133, dated October 11, 1898.

Application filed May 16, 1898. Serial No. 680,790. (No model.)

*To all whom it may concern:*

Be it known that I, WILLIAM B. LEONARD, a citizen of the United States, residing at Wallace, in the county of Fountain and State of Indiana, have invented certain new and useful Improvements in Agricultural Implements, of which the following is a specification.

The object of my present invention is to provide an implement by means of which the ground may be prepared as desired and seeded (when desired) at the same operation; and it consists in such a construction and arrangement of parts as enables these objects to be accomplished and includes means whereby the operating devices may be adjusted to varying positions in order to accomplish various grades of work, all as will be hereinafter more particularly described and claimed.

Figure 1:
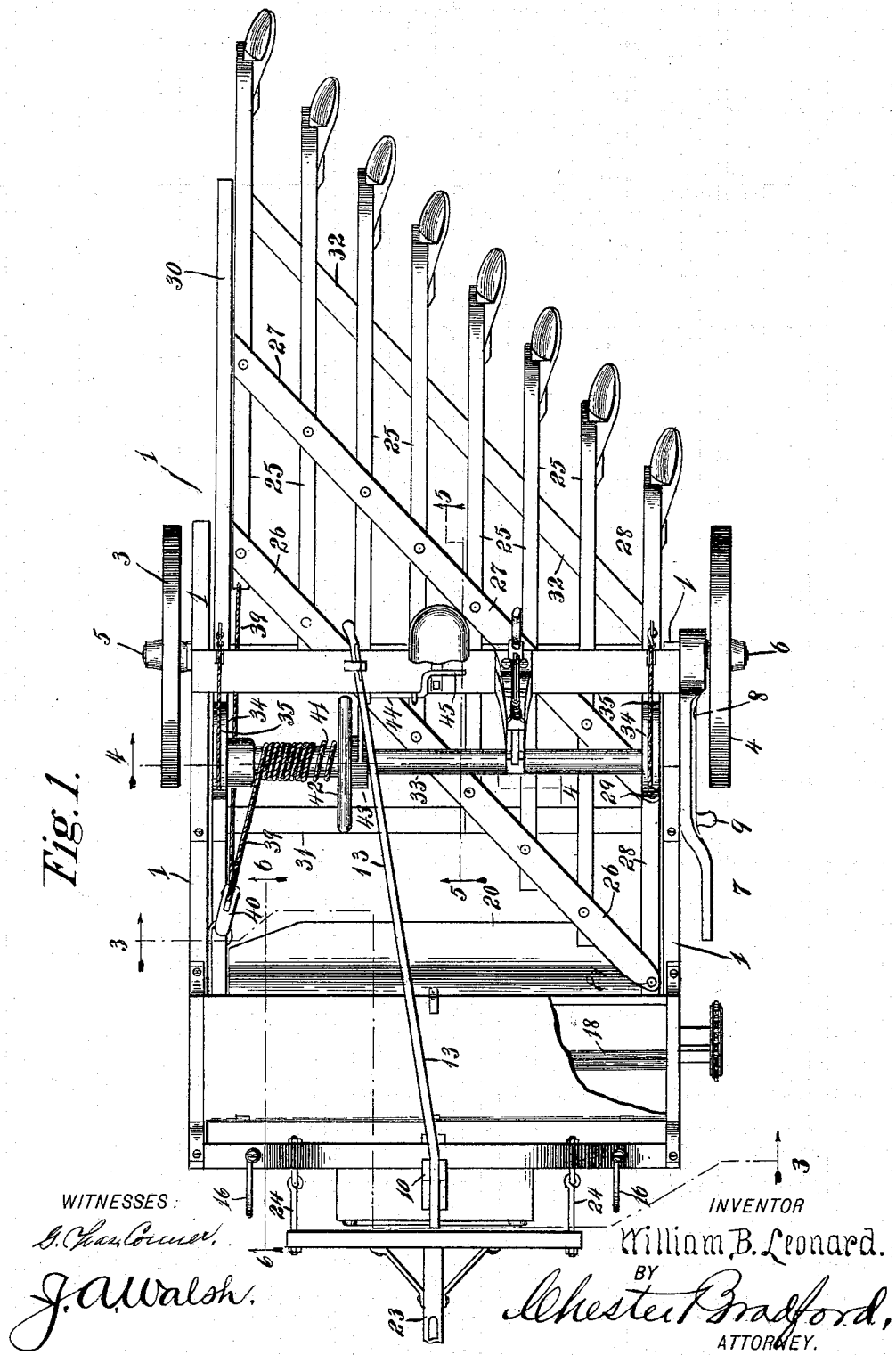
Figure 2:
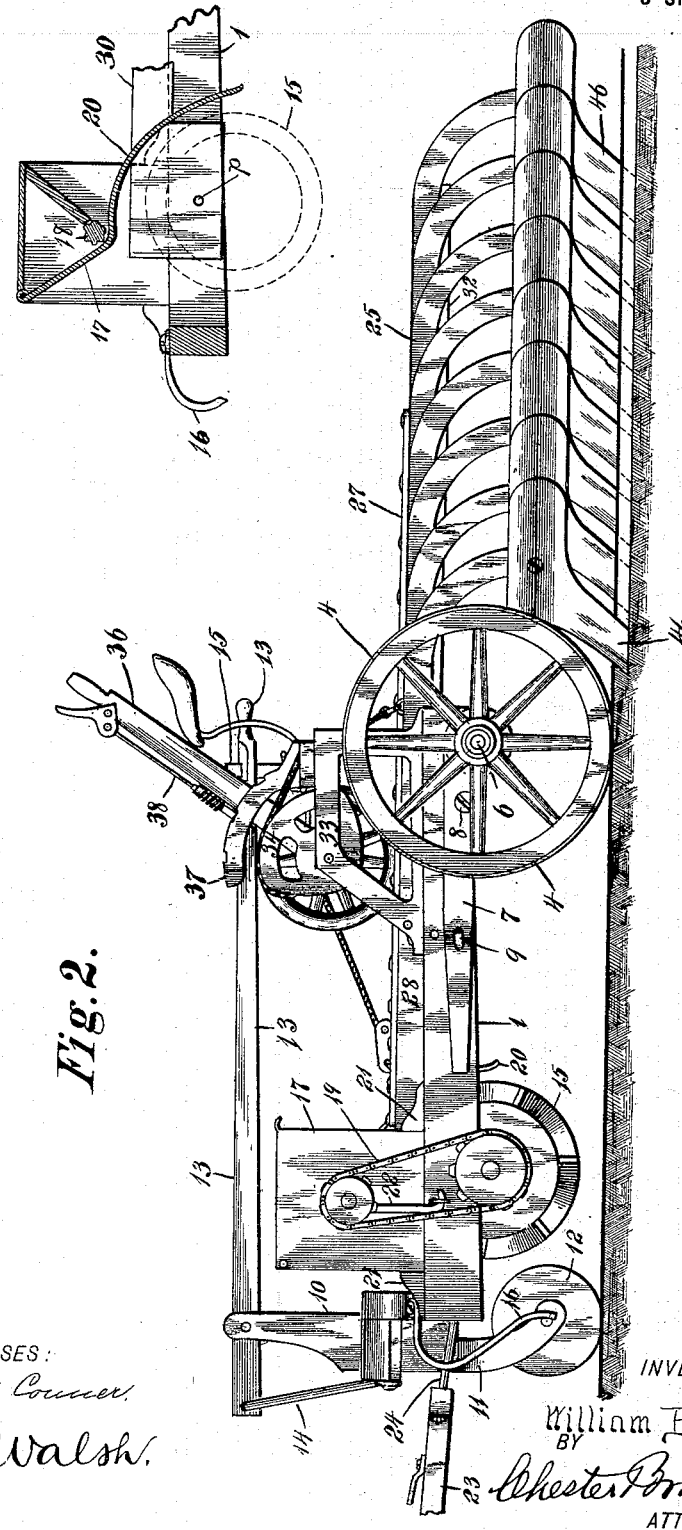
Figure 3:
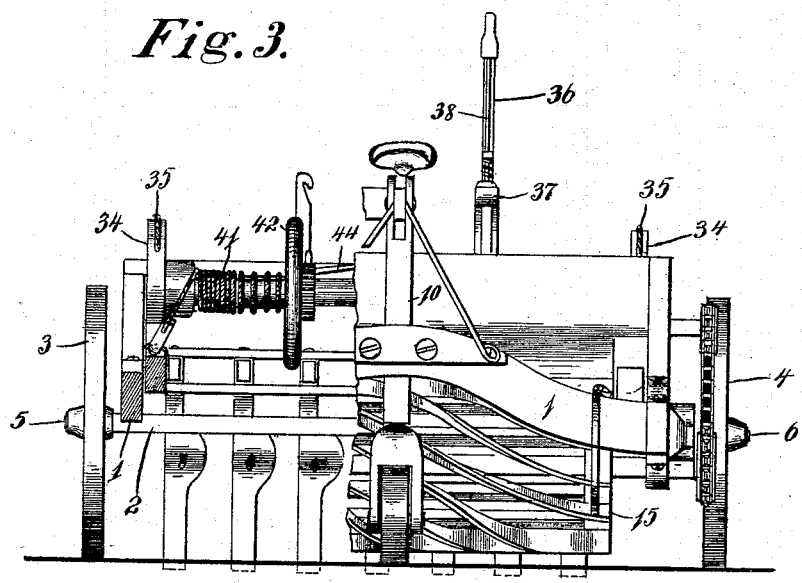
Figure 4:
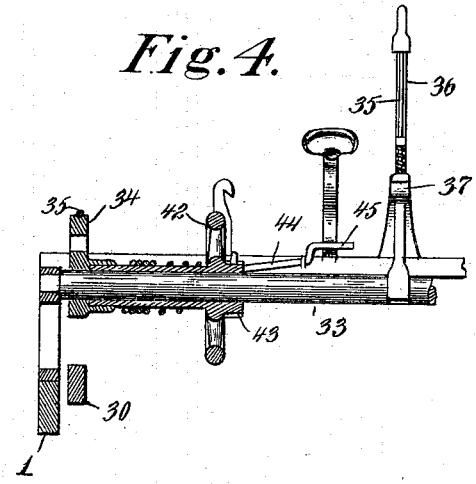
Figure 5:
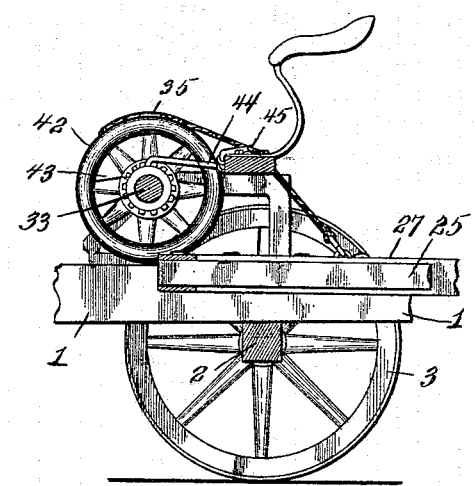

Referring to the accompanying drawings, which are made a part hereof, and on which similar figures of reference indicate similar parts, Figure 1 is a top or plan view of an implement embodying the various features of my said invention; Fig. 2, a side elevation of the same, the position illustrated being that when the pulverizing-roller is raised free from the ground and the plows are just entering the ground; Fig. 3, a view, partly in front elevation and partially in section, as seen from the dotted line 3 3 in Fig. 1; Fig. 4, a detail sectional view as seen from the dotted line 4 4 in Fig. 1; Fig. 5, a detail sectional view as seen from the dotted line 5 5 in Fig. 1, and Fig. 6 a detail sectional view as seen from the dotted line 6 6 in Fig. 1.

The main frame 1 is of a suitable construction and is mounted at its rear end on the axle 2, said axle being supported by suitable carrier-wheels 3 and 4, one of which is mounted on the spindle 5 and the other on the spindle 6. The spindle 5 is of an ordinary form and is substantially a part of the axle 2. The spindle 6 is carried by a bar 7, which is pivoted on the frame 1 by a pivot 8 and the position of which is controlled by any suitable means, such as a pin 9, entering any one of a number of holes in the frame 1. This wheel 4 is thus adapted to be raised and lowered in respect to the frame and the other wheel and other parts of the machine, so that it may run in a furrow and still maintain the general level of the machine. As the plows are adapted to cut to a greater or less depth, this bar 7 is arranged to be adjusted accordingly, the adjustment being effected by shifting the pin 9 to any desired one of the holes provided therefor in the frame 1, as will be readily understood.

Within a suitable slideway at the front end of the frame 1 is situated a vertically-movable standard 10, upon the lower end of which is pivotally mounted the wheel-housing 11, which carries a caster-wheel 12, which serves to carry this portion of the machine. To the upper end of the movable standard 10 is pivoted a lever 13, one end of which engages with a link or bar 14 on the frame 1 and the other end of which is adapted to engage with a catch 15 at a point near the driver's seat. When the lever is forced down and engaged with said catch, as shown in Fig. 2, the mechanism at the forward end of the machine is lifted off the ground, and said machine is supported by the wheels 3, 4, and 12. When, however, said lever is disengaged, then the standard 10 plays loosely in the slideway in which it is mounted, and the weight of the forward part of the machine comes onto and is carried by the pulverizing-roller, the caster-wheel during this time performing little, if any, service. Said pulverizing-roller 15 is mounted in suitable bearings carried by the frame 1, as shown in the drawings. This roller, as best shown in Fig. 3, is composed of a skeleton framework and a number of spirally-set cutting-blades, the effect of which as the machine proceeds on its way is to thoroughly cut off such things as vines and stalks and pulverize clods. Mounted upon the frame 1 and extending down in front of this roller 15 are certain spring-fingers 16, the effect of which is to throw around and straighten cornstalks and such like articles, so as to bring them into the best position to be cut or shredded by the roller 15.

Positioned above the pulverizing-roller 15 is a seedbox or hopper 17, within which, at the bottom, alongside the egress-opening therein, is a corrugated feed-roller 18. This feed-roller is driven, preferably, from the pulverizing-roller by means of a sprocket-chain 19, which runs over suitable sprocket-wheels on the ends of the shafts of said rollers, respectively, as best shown in Fig. 2. The seed as it is forced through the egress opening or slit by the roller 18 falls down onto the shield or scatterer 20 and thence to the ground in the rear of the pulverizing-roller, where it is adapted to be covered by the action of the plows which follow, as will be presently described. The seedbox or hopper 17 is preferably made removable, so that the machine can be used without it when desired. As a means of properly securing it in place and at the same time permitting its easy removal I have shown brackets 21 on the frame 1, between which said seedbox is placed, with hooks or hasps 22, by which it may be secured in place between said brackets. The interior of the seedbox or hopper and the corrugated feed-roller therein are partially shown in Fig. 1, where a portion of the cover to said seedbox is broken away for the purpose, and are also shown in section in Fig. 6.

The draft attachments are shown as consisting of a tongue 23, upon which the doubletrees, &c., may be mounted, which tongue is pivotally connected to the frame 1 by eyebolts 24.

This machine is designed to have a considerable number of plows, (eight are shown,) and these plows are adjustable, so that the furrows may be plowed further apart or nearer together, as may be desired. The several plow-beams 25 are each pivoted to two diagonally-arranged bars 26 and 27, and said plow-beams and said bars together form a structure which is adapted to be expanded and contracted upon the well-known principle of the lazy-tongs. One plow-beam 28 is designed to be stationary and forms one side of the plow-frame as well as a plow-beam. To this the two bars 26 and 27 are strongly pivoted at one end by the pivots 29, which may be termed "draft" pivots or connections. The plow-frame, consisting of said beam 28, a bar or beam 30 on the other side of the plow structure, a transverse bar 31, and a diagonal bar 32, may be said to constitute the plow-frame, and this frame is connected pivotally to the forward part of the general machine structure by having suitable strong pivots $p$ connected to the frame 1 just above the shaft to the roller 15, as shown in Fig. 6. The plow-frame and the plows carried thereby are thus permitted to be raised and lowered in respect to the frame 1.

I have provided a rock-shaft 33, which is mounted in suitable bearings carried by the frame 1, and this shaft has segments 34, which carry ropes 35, the ends of which are connected to the beams 28 and 30 of the plow-frame. This shaft 33 is adapted to be rocked by means of a handle or lever 36, and a notched segment 37, with which an ordinary latch-bolt 38 on said lever will engage, serves as the means for holding said shaft to any position desired, and consequently holding the plows to any desired elevation in relation to the ground being treated. In Fig. 2 the plows are shown at an intermediate position, as when plowing very shallow. Obviously when the machine is in position to be moved from place to place the plows would be entirely free from the ground, while in ordinary plowing they would penetrate the ground much deeper than shown, and in subsoiling, for which the plows here shown are peculiarly adapted, they would penetrate to a still greater depth. The position desired is readily secured merely by rocking the shaft 33.

As heretofore stated, the bars carrying the plow-beams are connected at one end by the pivots 29 to the combined plow-beam and plow-frame bar 28. The plow-beam at the opposite side is connected by means of a rope 39, running through a sheave 40, carried by the frame, to a spool 41, preferably mounted on the shaft 33. This spool can be revolved by any desired means and the rope thus wound up, drawing the plow-beams to any desired point, and I have shown a hand-wheel 42 as such means. A ratchet-wheel 43 is also on said spool, and a detent 44 engages with said ratchet-wheel. This detent terminates in a foot-lever 45, by which the operator is enabled to disengage it from the ratchet-wheel, when, under the force of the pull of the plows, the rope will be unwound from the spool, allowing said plows to fall backward and at the same time swing to one side, thus narrowing the spaces between the several plows. The draft of the plow, however, is not materially altered by this change in position of the plows, as the points of attachment to the plow-frame remain stationary, the sheave 40 being directly opposite the pivot 29 and correspondingly situated upon the frame, and the rope 39 draws continuously from this point irrespective of the positions of the plows themselves.

The form of the plows 46 is somewhat peculiar. The plow-points are shown as arranged substantially vertically and inclined slightly to one side, the moldboard formation being wholly at the top. Plows of this character are especially designed to pulverize and break up the ground to an unusual depth in situations where such plowing is desired. A larger number of plows of this form can be used within the space than of the ordinary form, so that the furrows can be cut very close together.

Having thus fully described my said invention, what I claim as new, and desire to secure by Letters Patent, is—

1. The combination, in a cultivating-machine, of the main frame carrying the various mechanisms, an axle on which said frame is mounted, wheels at the ends of said axle carrying said frame, one of said wheels being mounted on a spindle rigid with said axle and the other being mounted on a spindle carried on the bar 7 and positioned in line with said axle, said bar 7 pivoted at a point to one side of said axle to the side of the frame, adjusting means for said pivoted bar as the shifting pin 9, and the plows carried by said frame, substantially as set forth.

2. The combination, in a cultivating-machine, of the carrying-wheels, the main frame mounted on the axle thereof, a plow-frame of a laterally-rigid construction pivoted to the main frame at its front to be raised and lowered, a series of plow-beams carrying plows, diagonally-arranged bars running across said beams and connected thereto by pivots, one of the outside beams being stationary and constituting one side of said rigid plow-frame, and adjusting mechanism connected to the other side of said plow-beam structure, whereby said diagonal bars may be swung on their pivots to said stationary plow-beam, and thus adjust said plows nearer to or farther from each other, substantially as set forth.

3. The combination, in a cultivating-machine, of the carrying-wheels, the main frame supported thereby, a rigid plow-frame pivoted at its front, a series of plow-beams carrying plows, one of the outside beams constituting a side piece of said rigid frame, diagonal bars pivoted at their ends to said beam and pivotally connected to the other beams of said series, a rock-shaft, connections running therefrom to the sides of said plow-frame, whereby it may be raised and lowered, a spool on said shaft, and flexible connections running therefrom to the free side of said plow-beam structure, whereby said side may be adjusted back and forth to bring the plows nearer to or farther from each other, substantially as set forth.

4. The combination, in a cultivating-machine, of the wheels, the frame, the gang of plows adjustably carried thereby, adjusting mechanism, the pulverizing and cutting roll located in advance of said plows, and a caster-wheel mounted on a standard which standard is connected to the front end of said frame to be vertically adjusted, whereby said pulverizing-roll may be kept above contact with the ground or let down into operative position, substantially as set forth.

5. The combination, in an agricultural implement, of a main frame, wheels carrying the same, a rigid frame pivoted thereto, means for elevating and lowering said frame, a series of plow-beams mounted therein one of which forms the outside bar of said frame, diagonal bars pivoted at one end to said stationary side beams and pivotally connected to each of the other beams of the series, a spool mounted on the elevating-shaft for said frame, a sheave connected to the frame in advance thereof, a flexible connection running from said spool over said sheave to the free side of said plow-beam structure, whereby they may be swung on the pivots which connect said diagonal bars to the side beam to adjust the plows nearer to or farther from each other, a ratchet on said spool and a detent engaging with said ratchet, substantially as set forth.

In witness whereof I have hereunto set my hand and seal, at Indianapolis, Indiana, this 11th day of May, A. D. 1898.

WILLIAM B. LEONARD. [L. S.]

Witnesses:
    CHESTER BRADFORD,
    JAMES A. WALSH.